Figure 5:
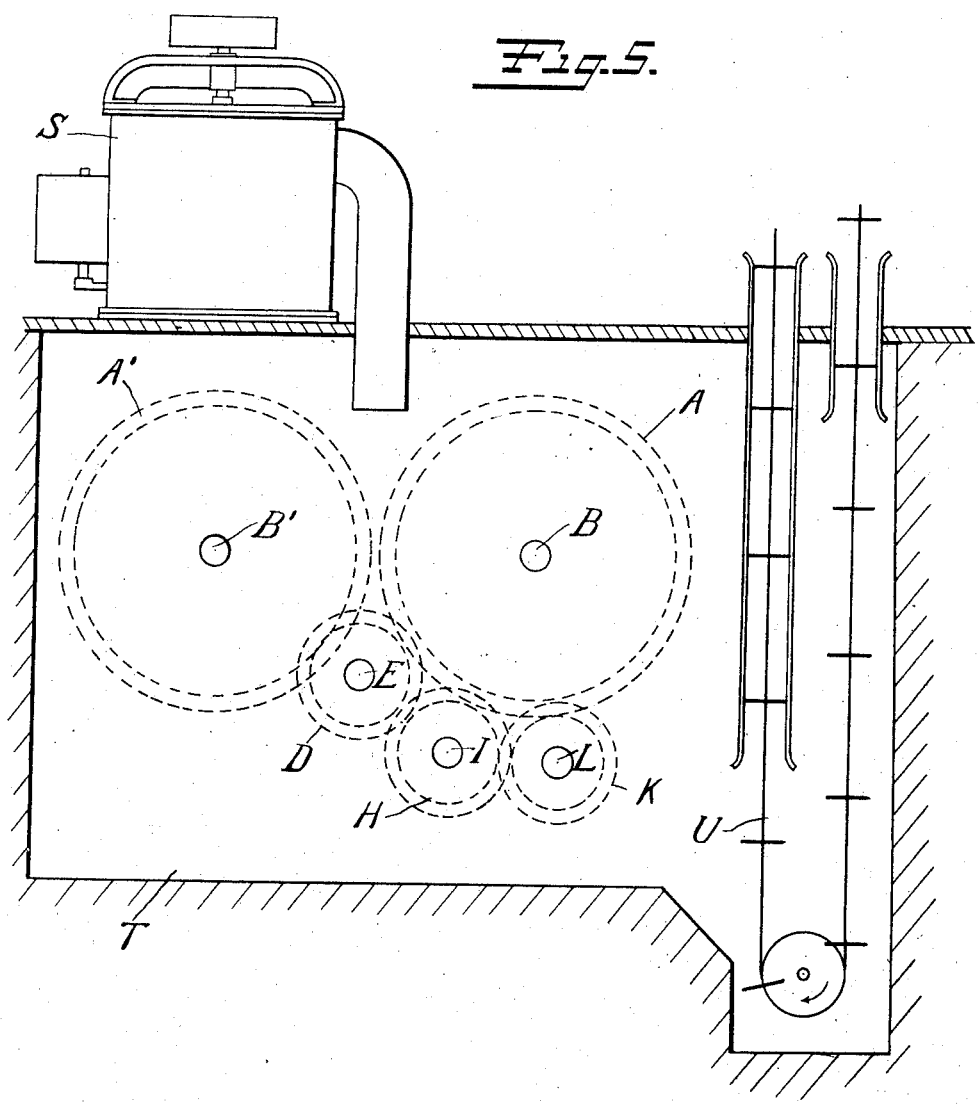

No. 883,210. PATENTED MAR. 31, 1908.
M. LEITCH.
METHOD OF TREATING TIN SCRAP.
APPLICATION FILED MAY 17, 1907.
3 SHEETS—SHEET 1.
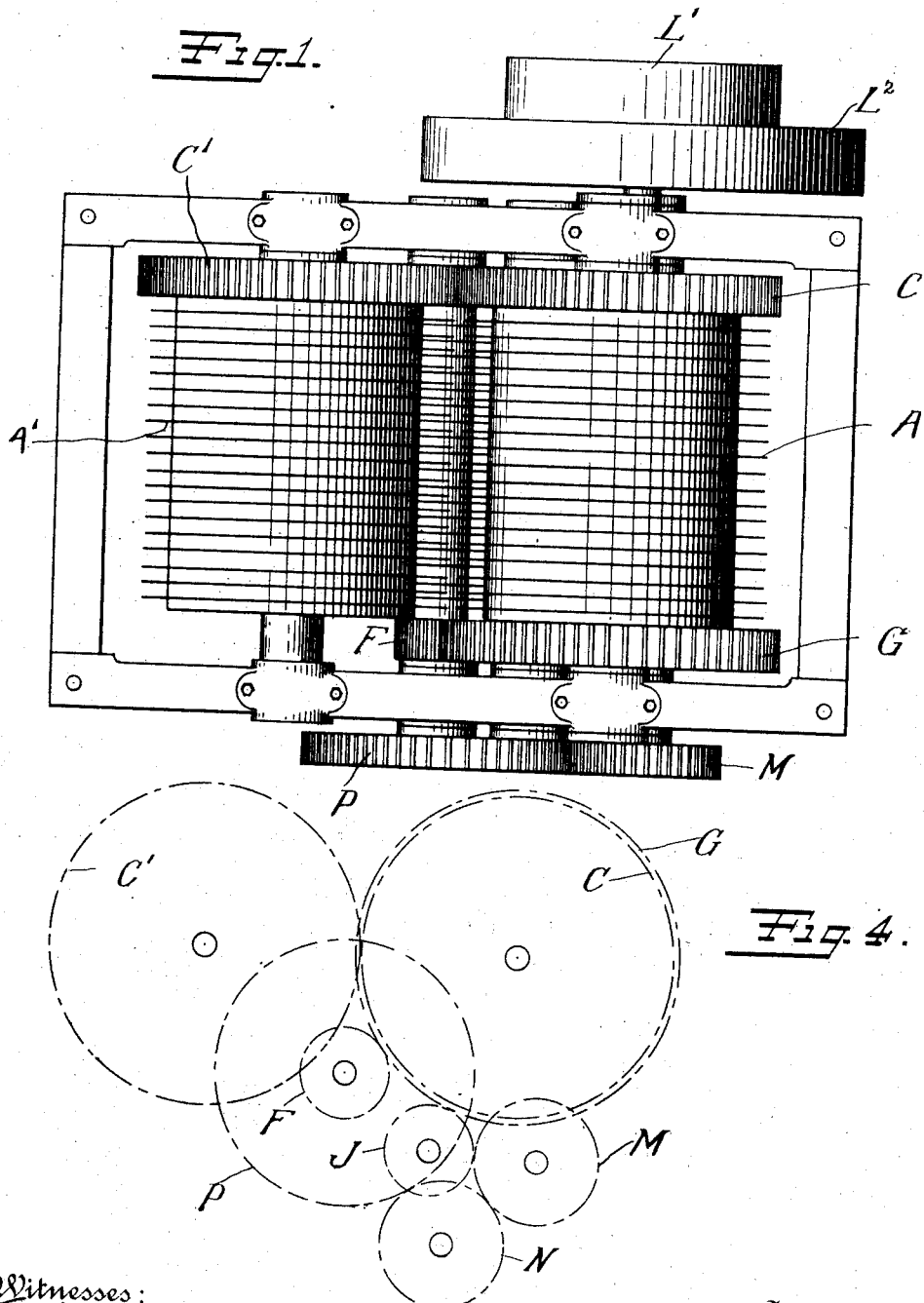
Witnesses:
F. M. Dannenfelser.
A. Mumford
Inventor
Meredith Leitch.
By his Attorney's
Bartlett, Brownell Mitchell No. 883,210. PATENTED MAR. 31, 1908.
M. LEITCH.
METHOD OF TREATING TIN SCRAP.
APPLICATION FILED MAY 17, 1907.
3 SHEETS—SHEET 2.
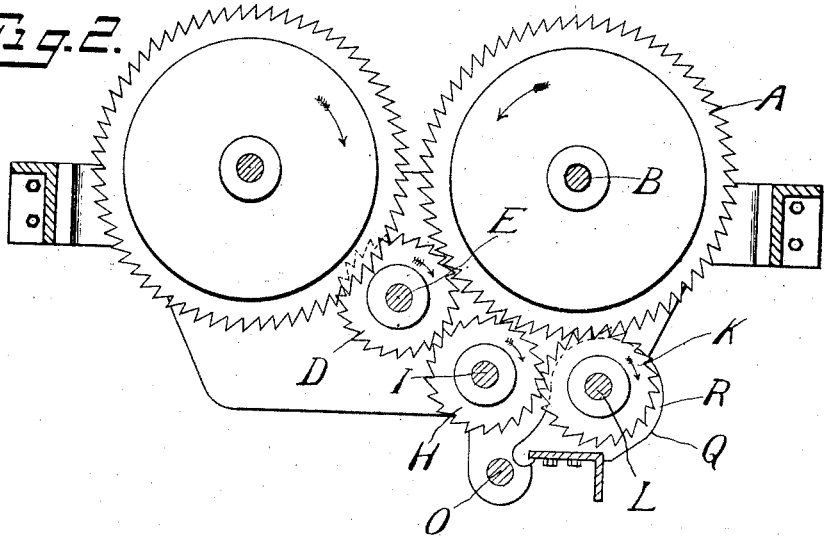
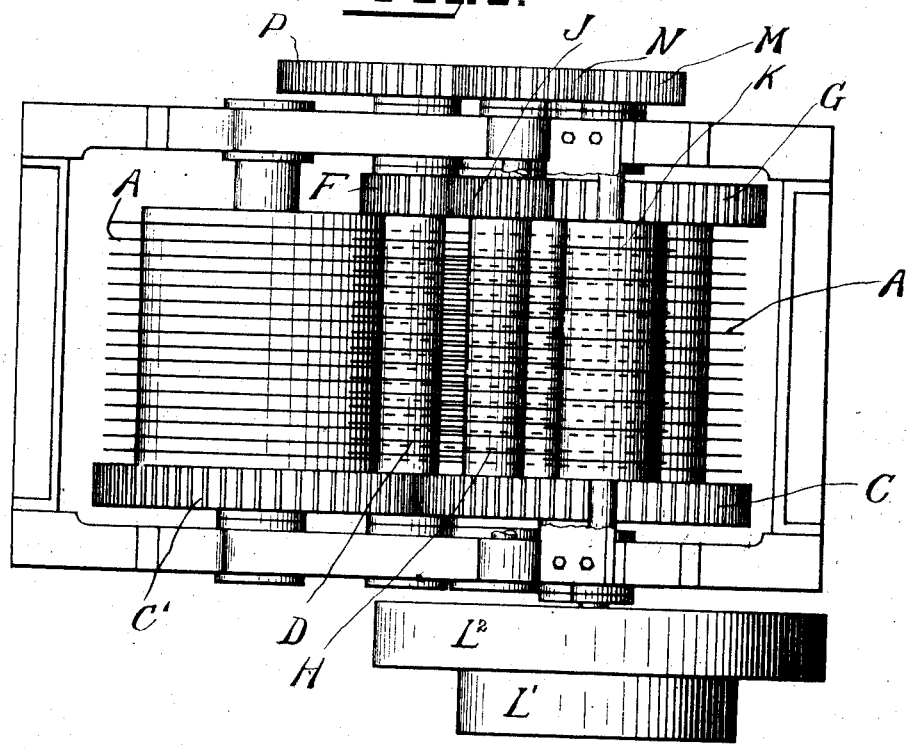
Witnesses:
F. M. Dannenfelser.
A. Morford.
Inventor
Meredith Leitch.
By his Attorneys
Bartlett, Maxwell & Williams No. 883,210. PATENTED MAR. 31, 1908.
M. LEITCH.
METHOD OF TREATING TIN SCRAP.
APPLICATION FILED MAY 17, 1907.

3 SHEETS—SHEET 3.

Witnesses:
F. M. Dannenfelser.
A. Morford.

Inventor
Meredith Leitch
By his Attorneys
Bartlett, Brownell & Mitchell

UNITED STATES PATENT OFFICE.

MEREDITH LEITCH, OF ELIZABETH, NEW JERSEY, ASSIGNOR TO METAL PROCESS COMPANY, A CORPORATION OF NEW YORK.

METHOD OF TREATING TIN-SCRAP.

No. 883,210.  Specification of Letters Patent.  Patented March 31, 1908.

Original application filed November 30, 1906, Serial No. 345,816. Divided and this application filed May 17, 1907. Serial No. 374,132.

*To all whom it may concern:*

Be it known that I, MEREDITH LEITCH, a citizen of the United States, residing at Elizabeth, Union county, New Jersey, have invented certain new and useful Improvements in Methods of Treating Tin-Scrap, of which the following is a full, clear, and exact description.

My invention has for its object to produce a new and improved method of treating old tin cans and similar tin scrap, preparatory to detinning.

One of the objects of my invention is to tear the cans apart so that the seams will be opened in order that the solder will be more completely removed before detinning and the tin within the seams may be removed in a subsequent detinning process. The tin and solder are thus saved and moreover are removed from the iron, which is very important since their presence in the iron when subsequently melted reduces its value.

Another object of my invention is to reduce the tin scrap to such form that it can be baled by pressure, that is, so that it can be compressed into bundles which will retain their form without being bound together by special binding means.

My method is preferably carried out by apparatus consisting of a furnace in which the tin scrap is heated sufficiently to melt the solder, a non-oxidizing atmosphere being maintained within the furnace. The tin scrap after it leaves the furnace is then fed to an apparatus where it is torn apart and cut up into strips. In the preferred form it is torn apart while the solder is still melted, this resulting in a more uniform and easy opening of the seams, as well as the dislodgment of solder contained within the seams, which solder can be collected and saved. The apparatus for tearing the tin scrap apart and cutting it into strips is surrounded by an atmosphere such that substantially no oxidization takes place.

In some forms the furnace may be omitted and the tin scrap fed into the rending and cutting machine in an unheated condition. This would be done, for instance, when it was desired to bale the tin scrap before desoldering, as might be the case where the desoldering plant was some distance from where the tin scrap was collected.

The following is a description of apparatus suitable for carrying out my method, reference being had to the accompanying drawings.

Figure 1 is a plan view of the rending or tearing and cutting apparatus; Fig. 2 is a side elevation of the same; Fig. 3 is a bottom plan view of the same; Fig. 4 is a diagram showing the pitch lines of the gears; and Fig. 5 is a diagram showing the same in combination with a desoldering furnace.

Referring more particularly to the drawings, A represents a gang of disks having projecting teeth and suitably mounted upon the shaft B. The teeth on the disks A are pointed in the direction opposite to the direction of rotation.

A' is a gang of disks mounted upon a shaft B', the two shafts B and B' being geared by gears C—C' together so that the two gangs rotate in opposite directions at the same speed. The teeth and the disks A' are preferably pointed in the direction of rotation. Another gang of smaller toothed disks D is mounted on the shaft E, which shaft carries a gear F meshing with the gear G on the shaft B. The gear F is of lesser diameter than the disks D and the gear G of greater diameter than the disks A with the result that the movement of the teeth on the disks D is slightly faster than the movement of the teeth upon the disks A. A second gang of toothed disks H, similar to the disks D, is mounted on the shaft I, which shaft carries a gear J similar to the gear F. A third gang of toothed disks K is mounted on the shaft L, which shaft carries a gear M. The teeth on the disks D, H and K all point in the direction of rotation. The gear M meshes with a gear N mounted on the shaft O, which meshes with the gear P upon the shaft E. The shaft L carries the driving wheel L' and the fly-wheel L². Power is applied to the driving wheel L so as to rotate it at a rapid rate, say 360 turns per minute. This power is transmitted through the gears M, N, P to the shaft E, which rotates at a very much slower speed, say 180 turns per minute. Power is transmitted from this shaft to the shaft A through the gears F, G and from the shaft A through the gears C—C' to the shaft of the disks A'. It is likewise transmitted through the gears G and J to the shaft I, which rotates at the same rate as the shaft E. Disks A and A' rotate at about 60 revolutions per minute.

The teeth of the disks D lie close to one side of the disks A, while the teeth of the disks H lie close to the other side of the disks A. The disks K are spaced twice as far apart as the disks upon the other groups, and are in line with every other one of the disks D. The disks are all made of thin metal, the disks A—A', D and H being slightly more than ⅛ inch, while the disks K are slightly less than ⅛ inch and should be made of strong steel.

The scrap which is to be torn asunder and cut up is fed between the disks A—A'. The teeth upon these disks A—A' engage the scrap and cause it to pass down between them, flattening or crushing it together somewhat. When the scrap reaches the gang of disks D it passes between these disks and the disks A. The teeth on the disks D enter the spaces between the disks A with the result that the scrap is impaled upon the teeth of the disks A and to a greater or less extent upon the disks D. Since the teeth on the disks D move at a faster rate than the teeth opposite them on the disks A (the movements of the opposing teeth being in the same direction) there is a tearing or rending action, and the seams of the tin scrap are torn apart. After passing the disks D the scrap is next subjected to the disks A, the teeth of which are also moving at a faster rate than the teeth upon the disks A, whereupon the scrap is subjected to a second tearing or rending action, which will open any seams which may have escaped before. From the disks A the scrap is next passed on to the disks K. These teeth are rotated at a very rapid rate so that a sawing action takes place. The scrap before it reaches them is impaled upon the teeth of the disks A, and is, therefore, held so as to be subjected to the action of these saws which cut it into shreds. It will be seen from the foregoing that the disks A constitute a slowly advancing abutment for the action of the rending or tearing of disks D and H and also constitute an abutment for the sawing disks K. In order that no scrap may adhere to the sawing disks K, I provide a stripper Q which consists of a series of members situated between the disks K and so shaped as to leave the saw teeth exposed for sawing action, but to come out to the tips of the saw teeth to the point R, so that any material which may adhere to the points will be forced off. The moving abutment furnished by the disks A is an important feature since it continually presents to the gangs D and H and the saws K a new surface. If a stationary abutment were used, scrap might become lodged upon it and accumulate so as to result in an obstruction. With the moving abutment, when a point passes from the saws K upward any scrap which has not otherwise been dislodged, drops off so that upon the next revolution of the disks A there will be no scrap adhering thereto.

In Fig. 4 I have shown a desoldering furnace S, such as is shown in my Patent No. 800,222, granted September 26, 1905. This furnace discharges the desoldered scrap into an inclosed chamber T containing the shredding apparatus. The scrap reaches the shredding apparatus while still hot, and the seams are torn apart while the solder is melted. A deoxidized atmosphere is maintained around the apparatus by reason of the gases escaping through the discharge opening of the furnace. A suitable elevator U is provided for removing the shredded scrap from the pit. By the time it reaches the surface it is sufficiently cooled so that danger of oxidization is passed. Scrap which has been thus treated has on it a minimum amount of solder. Its seams are well opened so that they can be thoroughly detinned. It is further cut up and made into a form such that it can be readily compressed into bundles which will hold their shape. All of which results are very valuable.

The apparatus described in this application is claimed in my copending application Serial No. 345,816, filed November 30, 1906, of which this is a division.

What I claim is—

1. The method of preparing tin cans and the like for detinning, which consists in heating the cans in a deoxidized atmosphere and tearing them apart while still heated.

2. The method of preparing tin cans and the like for detinning, which consists in heating them in a deoxidized atmosphere, tearing them apart while still heated, and then cutting them up into strips.

3. The method of preparing tin cans and the like for detinning, which consists in impaling them on two sets of teeth having a slow relative movement, and moving said teeth so as to tear the cans apart.

4. The method of preparing tin cans and the like for detinning, which consists in impaling them on two sets of teeth and moving said teeth so as to tear the cans apart, and later sawing the torn cans while still impaled on said sets of teeth.

5. The method of preparing tin cans and the like for detinning, which consists in flattening them out and tearing them apart so as open the seams and then cutting them into strips.

6. The method of preparing tin cans and the like for detinning, which consists in impaling them on teeth, slowly moving them while thus impaled, and successively subjecting them while thus impaled and moving to rending and cutting actions.

MEREDITH LEITCH.

Witnesses:
L. A. WELLES,
W. P. PALMER.